INVENTOR.
HARRIS A. STOVER
BY
Moody and Phillion
ATTORNEYS

United States Patent Office 3,273,065
Patented Sept. 13, 1966

3,273,065
MEANS FOR MEASURING SIGNAL INTENSITY WITHOUT INTERRUPTING THE RECEIVED SIGNAL
Harris A. Stover, Cedar Rapids, Iowa, assignor to Collins Radio Company, Cedar Rapids, Iowa, a corporation of Iowa
Filed Mar. 16, 1964, Ser. No. 352,200
12 Claims. (Cl. 325—67)

This invention relates generally to means for measuring the intensity of a received signal and, more particularly, to a means for measuring the intensity of a received signal without interrupting the reception of said received signal by the receiver.

In certain applications it is necessary that the intensity of a received signal be measured. For example, the testing of the radiation pattern of an antenna requires field intensity measurements. Prior art circuits for measuring field intensity frequently use a reference signal, the intensity of which is known. The reference signal and the signal to be measured are alternately received and their strength measured by some appropriate meter means. The strength of the signal to be measured can then be determined by the relative meter readings since the strength of the reference signal is known. However, such devices require that the received signal be interrupted during the time the reference signal is being received.

A primary object of the present invention is to provide means for measuring the intensity of a received signal without interrupting reception of the received signal.

A second aim of the invention is a means for measuring the intensity of a received signal by comparing it with the known intensity of a reference signal and without interrupting the reception of the received signal.

A third purpose of the invention is the improvement of field intensity measuring devices, generally.

In accordance with the invention, there is provided a receiver including an antenna for receiving the signal to be measured, a signal generator of known intensity included within the receiver, and first switching means for alternately connecting the received signal and the reference signal from the generator to said receiver; thus, in effect, alternately sampling the received and reference signals. The receiver comprises an R-F stage, a mixer stage, and an I-F amplifier. The output signal of the I-F amplifier is supplied to two channels, defined herein as the signal channel and the comparison channel. Second switching means, synchronized with said first switching means, connects the signal channel to the output of the I-F amplifier only during the times that the first switching means connects the input signal to the receiver. However, the comparison channel is connected to the I-F amplifier output at all times. The sampling rate is high enough to insure that the intelligence contained in the input signal is supplied to the output signal channel even though said output signal channel is disconnected from the I-F amplifier output half the receiving time. Included in the comparison channel is a wide band I-F filter, an A-M detector and a band-pass filter, all connected in cascade. When the reference signal generator and the received signal have different intensities, there will be produced at the output of band-pass filter a substantially sinusoidal signal whose frequency is equal to the sampling frequency and whose magnitude is proportional to the difference in intensity of the received signal and the input signal.

In accordance with a feature of the invention, the phase of the band-pass filter output signal can have two states with respect to the sampling rate, said states being 180° removed from each other. More specifically, if the intensity of the signal generator is greater than that of the received signal, the phase of the output signal of the band-pass filter will have one value and if the intensity of the reference signal is less than that of received signal, the phase of the output of the band-pass filter will be 180° removed.

A phase detector is provided to respond to the output signals from the band-pass filter and the sampling generator to provide a D.-C. voltage whose polarity and magnitude indicate the difference of intensity between the reference signal and the received signal, and which of the two signals is the larger. Both the band-pass filter and the detector outputs will be zero if the reference and received signal intensities are equal.

In accordance with another feature of the invention, the reference signal generator comprises a calibrated precision attenuator so that the output thereof can be adjusted until the intensity of the reference signal and the received signal are the same as indicated by the output of said phase detector. The intensities of both signals can be then read on the calibrated scale of the reference signal generator.

The above and other objects and features of the invention will be more fully understood from the following detailed description thereof when read in conjunction with the drawings in which.

Figure 1:
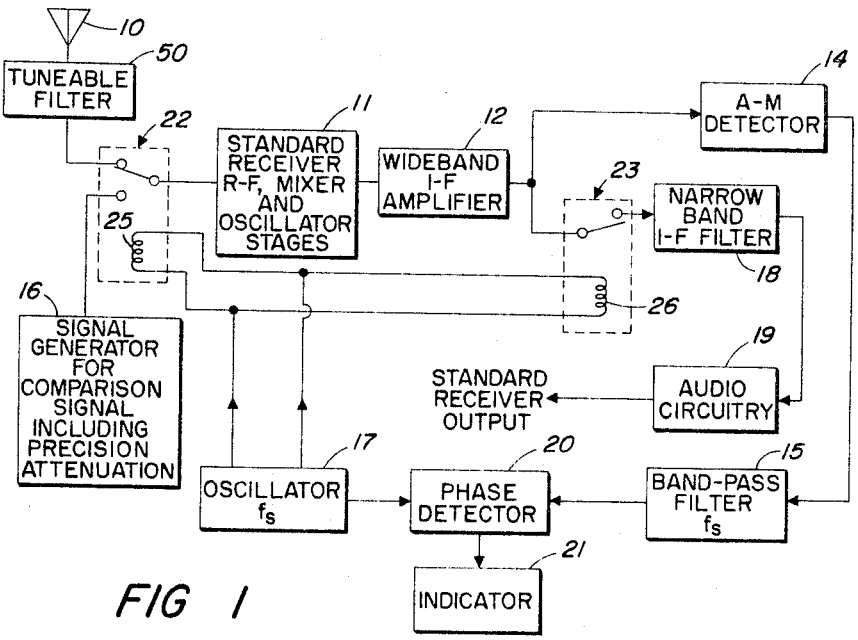
FIG. 1 shows a block diagram of the invention.

Referring now to FIG. 1, the received signal is intercepted by antenna 10 and applied through the armature of chopper 22 to the block 11 of the receiver. The block 11 includes the R-F stage, the mixer, and the local oscillator. Also supplied to the block 11 is the output of a signal generator 16 which includes an accurately calibrated precision attenuator. The chopper 22 is activated by the output of sampling signal generator 17 which generates a signal of frequency $f_s$ to energize the winding 25 of chopper 22 and also the winding 26 of chopper 23, as will be discussed later.

The output of the R-F section 11 of the receiver is supplied to the I-F amplifier 12 and thence to two channels. One of these two channels is identified as the signal channel including the narrow band I-F filter 18 and the audio circuitry 19. The other channel, identified as the comparison channel, comprises the A-M detector 14, and the band-pass filter 15, the output of which is supplied to a phase detector 20.

It should be noted that the chopper 23 functions to connect the output of the I-F amplifier to the narrow band I-F filter 18 (the signal channel) only during those time intervals that the input signal received by antenna 10 is supplied to the R-F section 11. However, such sampling rate is high enough so that the intelligence is retained in the sampled signal supplied to the filter 18. Such principles of sampling are well known in the art and will not be described in detail here. It is believed sufficient to state generally that the sampling rate should be at least two and one-half times the highest frequency component of the band containing the desired intelligence. On the other hand, the comparison channel is connected to the output of the I-F amplifier 12 at all times, so that both the reference signal from signal generator 16 and the received signal intercepted by antenna 10 are supplied to the comparison channel.

It is to be noted that the circuit of FIG. 1 can be designed in two different ways, both of which might have advantages over the other under certain conditions.

In one form of the invention the frequency of the received signal and the reference signal is the same, thus requiring a tunable reference signal generator. The R-F, mixer, and I-F amplifier stages must have a sufficiently wide band-pass to pass not only the received and reference signals, but also the first order sidebands produced by the effect of chopper 22. A tunable filter 50 functions to prevent passage of any signal but the desired received signal to the receiver, thus preventing intermodulation between the chopper and undesired frequencies which might result in a new frequency receivable by the receiver.

The narrow band filter 18 must exclude the sidebands produced by the modulating effect of the chopper signal on the received signal and pass only the intelligence bearing intermediate frequency.

In another form of the invention the frequencies of the received and reference signals can be quite different. Under such conditions the R-F stage 11 and the I-F stages must be sufficiently wide to cover not only the received and reference signals, but also the sidebands produced by the modulating effect of the chopper 22. Narrow band filter 18 remains unchanged.

The output of sideband I-F filter 12 is supplied to A-M detector 14 which performs A-M detection of the alternately sampled reference signal and received signal at the intermediate frequency level. As discussed above, the switching rate between the reference and received signals occurs at a frequency $f_s$. If the intensities of the reference signal and the received signal are different, the output of A-M detector 14 will contain a frequency component equal to $f_s$. Band-pass filter 15 is constructed to pass the frequency component $f_s$ and reject substantially all other frequency components produced by A-M detector 14. Thus, the output of band-pass filter 15 is essentially a sine wave signal having a frequency $f_s$.

The phase detector 20 is responsive to the output of band-pass filter 15 and also the output of oscillator 17 to produce a D.-C. voltage whose magnitude and polarity depend upon the relative magnitudes and phase relationships of the two signals supplied thereto.

Figure 2:
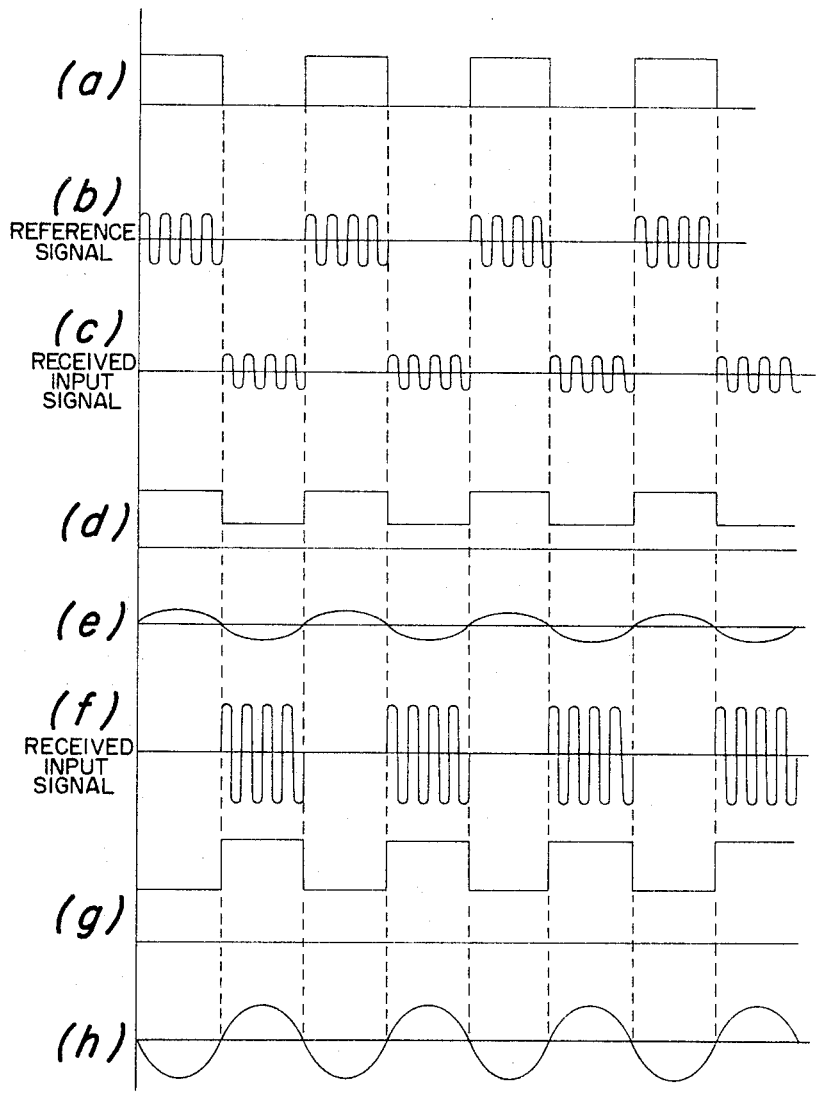
FIG. 2 is a set of waveforms to facilitate a description of the operation of the circuit.

As discussed above, the phase relationship between the signal from band-pass filter 15 and from oscillator 17 is either substantially zero degrees or 180°, depending upon whether the magnitude of the reference signal is greater or less than the intensity of the received signal. For a better understanding of the phase relationship of the outputs of band-pass filter 15 and oscillator 17, reference is made to the curves of FIG. 2a through FIG. 2f, wherein the curve of FIG. 2a shows the intervals of time in which the reference signal is being supplied to the R-F section 11 and the intervals of time the received signal is being supplied to R-F section 11. More specifically, the curve of FIG. 2a represents the action of the chopper 22 with the upper levels representing the time intervals when the reference signal is being supplied to R-F section 11 and the lower levels representing the time intervals that the received signal is being supplied to R-F section 11. The curve of FIG. 2b shows the intensity of the reference signal, and the curve of FIG. 2c represents the intensity of the received input signal when the received signal intensity is less than that of the reference signal. FIG. 2d represents the output of the A-M detector 16 and illustrates that under the conditions set forth in FIGS. 2b and 2c the curve of FIG. 2d is in phase with the curve of FIG. 2a; it being assumed that the positive half cycles of the output of oscillator 17 function to connect the reference signal to R-F section 11. The band-pass filter 15 responds to the waveform of FIG. 2d to produce the sine wave shaped signal of FIG. 2e.

FIG. 2f represents the sampled portion of an input signal which has an intensity greater than the intensity of the sampled portions of the reference signal shown in FIG. 2b. FIG. 2g represents the output of A-M detector 14 when the received input signal is as represented by the curve of FIG. 2f. It will be noted that the phase of the signal of FIG. 2g is 180° out of phase with the signal of FIG. 2a. FIG. 2h shows the output of band-pass filter 15 in response to the waveform of FIG. 2g.

As indicated above, the phase detector 20 is constructed to provide the required demodulation to produce a voltage with a magnitude proportional to the difference between the two applied signals and a polarity dependent upon which of the applied signals is larger.

The indicator 21 can be any suitable indicator which will indicate polarity and magnitude of a D.-C. voltage. Such indicators are well known in the art and will not be described in detail herein. The signal generator 16 of FIG. 1 includes a precision attenuator which is calibrated so that the output thereof may be increased or decreased until it is equal in intensity to the intensity of the received input signal. Such equalization of the intensities of the reference signal and the input signal can be visually observed by the operator on the indicator 21. When the indicator 21 indicates that no D.-C. voltage is being produced by the phase detector 20, the precision attenuator has been adjusted such that the intensities of the received and the reference signals are equal. A reading of the calibration of the reference of the precision attenuator can then be made to determine precisely the intensity of the received input signal.

Figure 3:
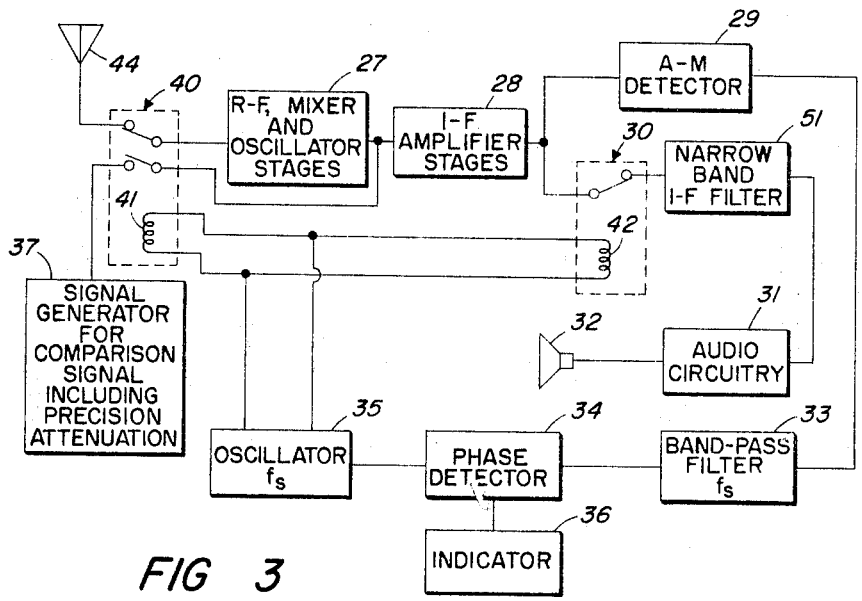
FIG. 3 shows another form of the invention.

Referring now to FIG. 3, there is shown a form of the invention in which the output of the signal generator 37 is supplied directly to the input of the I-F amplifier stages 28 rather than to the R-F section 27. With such an arrangement, the frequency of the reference signal can be that of the I-F. The I-F amplifier stages must still be wide enough, however, to pass the first order sidebands produced by the modulating effect of the chopper 40 upon the received signal and the reference signal. The output signal of I-F stage 28 can be fed into the narrow bandwidth filter 51 and then into audio circuitry 31 of FIG. 3 and also into the A-M detector 29. The output of A-M detector 29 is substantially the same as the output of the A-M detector 14 of FIG. 1.

Similarly, the function of band-pass filter 33, phase detector 34, oscillator 35, and indicator 36 correspond respectively to the operation of blocks 15, 20, 17, and 21 of FIG. 1.

In FIG. 3 the chopper 26 is somewhat different from the corresponding chopper 22 of FIG. 1 in that chopper 26 has two armatures therein which separately control the signals received from antenna 44 and the signal generator 37. The two armatures are necessary to supply the output signal of generator 16 directly to the I-F amplifier stages 28.

It is to be noted that the forms of the invention shown and described herein are but preferred embodiments thereof and that various changes may be made in the circuit arrangements without departing from the spirit or the scope of the invention.

I claim:
1. Signal intensity measuring means in combination with receiver means which comprises:
   R-F stage means,
   I-F stage means,
   and audio stage means arranged in tandem,
said signal intensity means comprising:
   signal generator means for generating a reference signal $f_r$ antenna means for intercepting a received signal of carrier frequency $f_c$,
   first switching means for alternately switching the signal intercepted by said antenna means and the reference signal to said receiver means at a switching frequency $f_s$,
   signal source means for supplying a signal of frequency $f_s$ to energize said first switching means where $f_s$ is at least one and one-half times $f_c$,
   comparison channel means responsive to the intensity difference between the received signal and the reference signal to provide an output signal of frequency $f_s$ whose amplitude and phase are representative of the intensity difference between the received and reference signals and which of the two signals has the larger intensity, means responsive to the output signal of said comparison channel and said signal source means output signal to indicate the intensity different between the received and reference signals and which has the greater intensity.

2. Signal intensity measuring means in accordance with claim 1 in which $f_r$ is substantially equal to $f_c$, and comprising:

second switching means for connecting said audio stage means to the output of said I-F stage means during the time intervals that said received signal is being supplied to said receiver means and for disconnecting said audio stage means from the output of said I-F stage means during the time intervals that said reference signal is being supplied to said receiver means.

3. Signal intensity measuring means in accordance with claim 2 in which said first switching means is constructed to supply said received signal and said reference signal alternately to said R-F stage means.

4. Signal intensity measuring means in accordance with claim 3 in which said R-F stage means and said I-F stage means have frequency bandwidths wide enough to pass the received signal in both its original frequencies and its intermediate frequencies, respectively, plus the first order sidebands produced by the switching of said first switching means.

5. Signal intensity measuring means in accordance with claim 4 in which:

said comparison channel is responsive to the output signal of said I-F stage means;

and in which said audio stage means comprises filter means constructed to pass only the intelligence bearing intermediate frequencies and to exclude the sidebands generated by the switching action of said first switching means.

6. Signal intensity measuring means in accordance with claim 1 in which $f_r$ is substantially different from $f_c$.

7. Signal intensity measuring means in accordance with claim 6 in which said first switching means is constructed to supply said received signal and said reference signal alternately to said R-F stage means.

8. Signal intensity measuring means in accordance with claim 7 in which said R-F stage means and said I-F stage means have a frequency bandwidth wide enough to pass the received signal and the reference signal in their received and intermediate frequencies plus the first order sidebands produced by the switching action of said first switching means.

9. Signal intensity measuring means in accordance with claim 8 in which:

said comparison channel is responsive to the output signal of said I-F stage means;

and in which said audio stage means comprises filter means constructed to pass only the intelligence bearing intermediate frequencies and to exclude the sidebands generated by the switching action of said first switching means.

10. Signal intensity measuring means in accordance with claim 1 in which:

the frequency of said reference signal is equal to the intermediate frequency of the receiver;

said first switching means is constructed to supply the received signal to said R-F stage means and the reference signal to said I-F stage during alternate half cycles of the output signal of said first switching means;

and comprising;

second switching means for connecting said audio stage means to the output of said I-F stage means during the time intervals that said received signal is being received by said R-F stage means, and for disconnecting said audio stage means from the output of said I-F stage means during the time intervals that said refrence signal is being supplied to said I-F stage means.

11. Signal intensity measuring means in accordance with claim 10 in which:

said R-F stage means has a frequency bandwidth wide enough to pass the received signal plus the first order sidebands produced by the switching action of said first switching means;

and in which said I-F stage means has a frequency bandwidth wide enough to pass intermediate frequencies of the received signal, the reference signal, and the first order sidebands produced by the action of said first switching means.

12. Signal intensity measuring means in accordance with claim 11 in which:

said comparison chanel is responsive to the output signal of said I-F stage means;

and in which said audio stage means comprises filter means constructed to pass only the intelligence bearing intermediate frequencies and to exclude the sidebands generated by the switching action of said first switching means.

No references cited.

DAVID G. REDINBAUGH, *Primary Examiner.*

J. W. CALDWELL, *Assistant Examiner.*